Feb. 20, 1951 H. F. MINTER 2,542,827
COPOLYMERS OF VINYL ARYL COMPOUNDS, ACRYLONITRILE, DIALLYL
ESTERS, AND UNSATURATED DICARBOXYLIC ACIDS, AND THEIR
ANHYDRIDES AND PRODUCTS PRODUCED THEREFROM
Filed Feb. 20, 1950

WITNESSES:

INVENTOR
Herbert F. Minter.
BY
Frederick Shapoe
ATTORNEY

Patented Feb. 20, 1951

2,542,827

UNITED STATES PATENT OFFICE 2,542,827

COPOLYMERS OF VINYL ARYL COMPOUNDS, ACRYLONITRILE, DIALLYL ESTERS, AND UNSATURATED DICARBOXYLIC ACIDS AND THEIR ANHYDRIDES AND PRODUCTS PRODUCED THEREFROM

Herbert F. Minter, Pittsburgh, Pa., assignor to Westinghouse Electric Corporation, East Pittsburgh, Pa., a corporation of Pennsylvania Application January 20, 1950, Serial No. 139,762

6 Claims. (Cl. 260—41)

This invention relates to heat thermosettable copolymers and products produced therefrom and in particular mica insulation.

Shellac has been used extensively in the preparation of mica insulation. The shellac, dissolved in a solvent such as alcohol, is applied to mica flakes and after removing the solvent, the mica flakes and applied shellac are heated and pressed to produce a bonded mica sheet. A number of such sheets may be stacked to produce a relatively thick member which is pressed at an elevated temperature for a short period of time to produce a durable hard laminate. The mica laminate may be sanded or milled to predetermined thickness and heated again to soften the shellac after which it is put in a shaping die so that the mica laminate may be formed to the shape of the die. After cooling under pressure, the shellac bonded mica member is employed as electrical insulation. This process has been employed for producing V-rings and similar members. However, shellac does not completely thermoset and under certain conditions of temperature and pressure in service, the mica flakes often will slip or squeeze out, especially when thick layers of the shellac are present due to non-uniform distribution in the laminates. An additional undesirable feature inherent in the use of shellac is its variability inasmuch as it is a natural product and often times the processing of shellac must be varied from shipment to shipment in accordance with the particular characteristics of the lot of shellac being handled.

The object of this invention is to provide a synthetic resinous adhesive or bonding agent for mica flakes which may be applied in a manner similar to shellac, but which will thermoset completely after heating at an elevated temperature.

A further object of the invention is to provide a resinous copolymer that may be employed for treating members after which the copolymer may be thermoset.

Other objects of the invention will, in part, be obvious and will appear hereinafter. For a better understanding of the nature and object of the invention, reference should be had to the following detailed description and drawing in which:

Fig. 2 is a fragmentary vertical cross-section through a hot press;

Fig. 3 is a view in perspective of a partly cured mica laminate;

Fig. 4 is a view in elevation;

Fig. 5 is a plan view of a punched ring;

Fig. 6 is a fragmentary vertical section through a hot press; and

Fig. 7 is a plan view partly broken of a mica V-ring.

Figure 1:
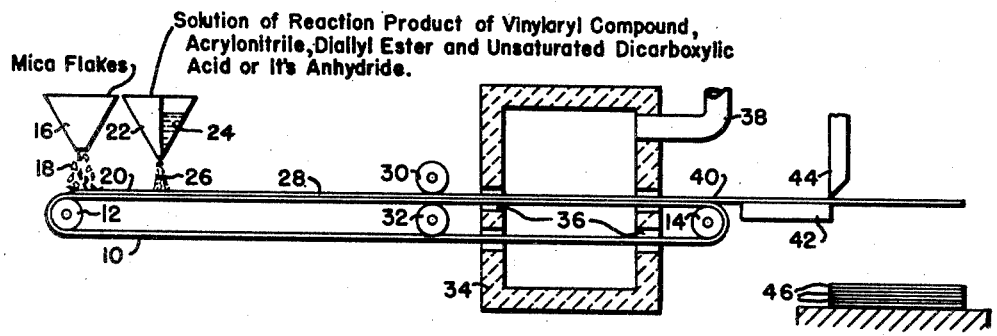
Figure 1 is a view in elevation, partly in section, of apparatus for producing mica sheets.
Figure 1:
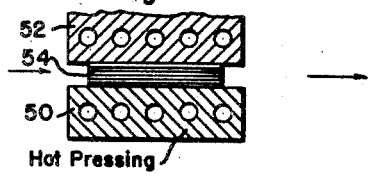
Figure 1:
Figure 1:
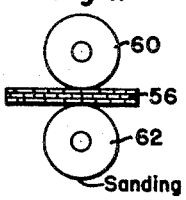
Figure 1:
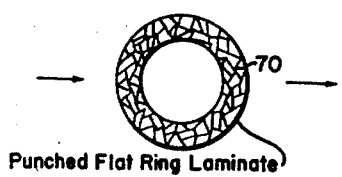
Figure 1:
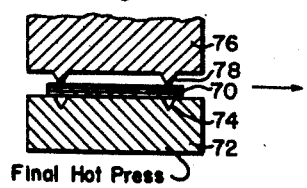
Figure 1:
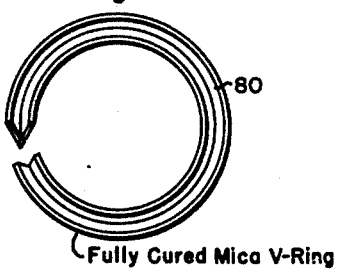

In accordance with this invention, a resinous copolymer is produced that has an initial solvent soluble, potentially reactive state such that the copolymer may be heated at temperatures of up to 130° C. and higher for short periods of time without causing the resin to thermoset. Thereafter, the copolymer may be polymerized to a fully thermoset resin insoluble in solvents and resistant to flow when heated. Other properties of the compositions will be disclosed hereinafter. The resinous copolymer has outstanding adhesion to mica.

The copolymer of the present invention is produced by refluxing in an organic solvent having a boiling point of from 50° C. to 130° C., a mixture of the following:

(a) From 1 to 4 moles of a nitrile having the formula

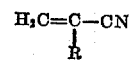

where R is a monovalent radical selected from the group consisting of hydrogen, methyl, ethyl, propyl and chlorine, (b) From 2 to 4 moles of at least one vinyl aryl compound having the formula

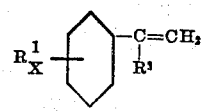

where $R^1$ is a substituted monovalent radical selected from the group consisting of chlorine, fluorine and methyl, X is a number from 1 to 3, and $R^2$ represents a radical selected from a group consisting of hydrogen and methyl, (c) From ¾ to 2 moles of at least one acidic compound selected from the group consisting of ethylene alpha-beta dicarboxylic acids and their anhydrides, and (d) From 0.5 to 3 moles of a diallyl ester of a dicarboxylic organic acid.

The mixture is refluxed in the presence of from ½% to 5%, based on the weight of the reactants, of a peroxide catalyst. Suitable peroxide catalysts are benzoyl peroxide, tertbutyl peroxide, cumene hydroperoxide, 2,2-bis(tertbutylperoxy)-butane, ditertbutyl peroxide, tertbutyl perbenzoate, ditertbutyl diperphthalate, and tertbutyl hydroperoxide. The refluxing of the reactants is conducted for a period of time corresponding to 5 hours for a reflux temperature of from 70° C. to 110° C. and with from 1% to 4% by weight of the catalyst being present. For other temperatures and other amounts of catalyst, the reflux time is greater or less in inverse proportion to the departure from this range of temperatures and this range of amount of catalyst. In any event, the refluxing is carried out only to a point short of producing an insoluble resin. If the refluxing is terminated after only a short reflux time, only a small amount of the copolymer will have been formed and the remainder of the reactants will be lost in subsequent processing.

Numerous relatively non-reactive organic solvents may be employed in the reaction for conducting the refluxing. Examples of suitable organic solvents are esters such as ethyl acetate and butyl Cellosolve, and ketones such as methyl ethylketone, acetone, and diethyl ketone. A portion of such solvents may be aliphatic hydrocarbons such as naphthas. The proportion of the reactants to the solvent may be varied to provide solutions having from 20% to 90% by weight of the solvent, and the remainder being the reactants and the catalyst.

Particularly good results have been secured by employing as the (a) nitrile, acrylonitrile, however, methylacrylonitrile, ethyl acrylonitrile, propyl acrylonitrile and chloracrylonitrile may be substituted in whole or in part therefor. Monostyrene has been a particularly suitable (b) vinyl aryl compound, however, various nuclear substitute styrenes with from 1 to 3 atoms of hydrogen replaced by chlorine, fluorine or methyl radicals give good results and may be substituted in whole or in part for monostyrene. Thus, 2,4-dichlorostyrene, 2,5-difluorostyrene and para-methylstyrene may be employed. Alphamethylstyrene and alphamethylparamethylstyrene are examples of other vinyl aryl compounds suitable for practice of the invention. Examples of suitable ethylenic dicarboxylic acids and their anhydrides are maleic acid, maleic anhydride, citraconic acid, chloromaleic acid and methylmaleic anhydride. Suitable diallyl esters are diallyl phthalate, diallyl succinate, diallyl oxalate, diallyl adipate, diallyl maleate and diallyl sebacate, and mixtures thereof may be employed.

For bonding mica, a particularly suitable copolymer was prepared by refluxing a mixture of (a) from 25 to 35 parts by weight of monostyrene; (b) from 10 to 20 parts by weight of acrylonitrile; (c) from 10 to 20 parts by weight of maleic anhydride and (d) from 45 to 35 parts by weight of diallyl phthalate, the total being 100 parts and employing as a catalyst from 2 parts to 4 parts of a peroxide catalyst. The following examples illustrate the preparation of the solvent soluble resinous copolymer.

Example I

Into a reaction vessel there was introduced the following:

| | Parts |
|---|---|
| Monostyrene | 30 |
| Acrylonitrile | 15 |
| Maleic anhydride | 15 |
| Diallyl phthalate | 40 |

150 parts of methyl ethyl ketone was added to the reaction vessel and finally 3 parts of benzoyl peroxide. The mixture was refluxed for 5 hours to a condition short of producing an insoluble resin. The resulting resinous solution could be applied to mica flakes in the apparatus shown in Fig. 1 of the drawing.

Fig. 1 is a schematic view of a conventional mica sheet forming machine. The machine comprises an endless belt 10 mounted for rotation about driven pulleys 12 and 14. A hopper 16 is arranged at the end of the belt adjacent to pulley 12 to apply thereon mica flakes 18 as a thin uniform layer 20. The mica flake layer 20 is moved by the belt 10 under a hopper 22 containing the solution 24 of the copolymer reaction product. A thin stream 26 of the solution 24 is applied in an amount to coat the surfaces of the mica flakes. The resulting layer 28 of mica flakes wetted with the copolymer solution is then moved by the belt between two squeeze rolls 30 and 32 which serve to compact the mica flakes and to distribute the resinous solution more uniformly between them. Thence, the belt passes into an oven 34 through apertures 36. In the oven 34, the solvent is evaporated from the layer 28 and escapes up a flue 38. After drying, the mica flakes in the layer 28 will be bonded by the tacky resinous copolymer into a sheet 40 which may be handled, cut and otherwise treated without excessive separation or loss of mica flakes. The sheet 40 separates from the belt 10 as the belt passes over the pulley 14 and slides upon a table 42 cooperating with a shear 44 for cutting into predetermined sized sheets 46.

Referring to Fig. 2 of the drawing, there is illustrated a hot press, comprising a bed 50 and a movable platen 52, in which is placed a stack 54 of a selected number of mica sheets 46. After a few minutes at a temperature of above 100° C. but not exceeding 170° C. and a pressure of from 20 to 500 pounds per square inch, the stack 54 is converted into a partly cured mica solidified laminate 56 as shown in Fig. 3 of the drawing. The pressing may be carried out for as much as ½ hour at a temperature of 125° C. to as little as 5 minutes at 170° C. In this hot pressing operation, the copolymer cures further but is short of a thermoset condition. The laminate 56 will be hard and dry possessing considerable mechanical strength. The laminate 56 may be machined to a uniform predetermined thickness by passing it through a sanding machine compising sanding rolls 60 and 62 as shown in Fig. 4 of the drawing, or through a milling machine.

After having been reduced to predetermined thickness, the laminate 56 can be cut or punched or sawed to any desired shape. For making V-rings, the laminate 56 is first punched into a circular flat ring 70 as shown in Fig. 5 of the drawing. The ring 70 may be then put in a hot molding press shown in Fig. 6 of the drawing for molding into a V-ring. The press comprises a lower heated base 72 provided with a circular V-groove 74 and an upper movable head 76 provided with a V-projection 78. Upon heating the V-ring 70 in the press of Fig. 6 under a suitable pressure of at least 100 pounds per square inch and a temperature of above 130° C., but not exceeding 300° C., for from 15 minutes to one hour the resin in the ring 70 is thermoset. The V-ring may then be removed from the press and it will be thermoset into the form of the V-ring 80 shown in Fig. 7 of the drawing.

In other cases the ring 70 may be put on a hot plate or into an oven and heated to a temperature of from 150° C. to 250° C. for a few minutes to soften the copolymer resin, then the ring is placed in a hot die at a temperature of above 130° C. and pressed into a V-ring for 15 minutes or more to thermoset the copolymer resin.

Laminated mica and resin copolymer V-rings produced in accordance with this invention have been tested in electrical equipment under the most severe conditions where they have been subjected to temperatures of over 175° C. and pressures of over 1000 pounds per square inch for prolonged periods of time without slipping, skidding, or otherwise deforming. They have exceeded the maximum requirements possible with shellac bonded mica. The resins of this invention in the thermoset state are unaffected by oil, water and all the common organic solvents.

*Example II*

Into a reaction vessel equipped with a stirrer and a refluxing column there was introduced 60 parts of methyl ethyl ketone and 40 parts by weight of reactants composed of 1 mole of maleic anhydride, 3 moles of acrylonitrile, 1 mole of monostyrene and 1 mole of diallyl diglycollate, and 0.4 part by weight of tertiary butyl perbenzoate. The mixture was refluxed for 5 hours with constant stirring. A resin solution suitable for treating mica flakes, as in Example I, resulted.

Other copolymers were produced by reacting the following mixtures in which all parts are by moles:

|   | Acrylonitrile | Monostyrene | Maleic Anhydride | Diallyl Phthalate |
|---|---|---|---|---|
| A | 3 | 3 | 1 | 1 |
| B | 2 | 2 | 2 | 2 |
| C | 2 | 2¾ | 1 | 1 |
| D | 2½ | 2 | 2 | 3 |

By varying the proportions of the four reactants, resins may be produced which when thermoset will vary from flexible to hard and brittle thermoset solids. The resins in the solvent soluble stage are suited for applications to fabrics and other fibrous materials from which laminates may be made. Thus asbestos paper, asbestos cloth and fiberglass cloth have been impregnated with the soluble resins and laminates that are extremely hard and durable produced by pressing the treated fabrics in a hot press. The resins are characterized by the property of requiring long heat treatment at a moderate elevated temperature to convert them to the thermoset state. For many molding operations this is a desirable feature.

Since certain changes in carrying out the above process and certain modifications in the composition which embodies the invention may be made without departing from its scope, it is intended that all matter contained in the above description shall be interpreted as illustrative and not in a limiting sense.

I claim as my invention:

1. Insulation comprising mica flakes and a resinous binder applied to the mica flakes, the resinous binder comprising the thermoset reaction product derived by refluxing in an organic solvent having a boiling point of from 50° C. to 130° C. from 1 to 4 moles of acrylonitrile, from 2 to 4 moles of monostyrene, from ¾ to 2 moles of maleic anhydride, from ½ to 3 moles of diallyl phthalate, and from 0.5 to 5%, based on the weight of the reactants, of a peroxide catalyst, the refluxing being conducted at a temperature of between 50° C. and 130° C. for a period of time, the time being of the order of 5 hours for a reflux temperature of from 70° C. to 110° C. with from 1 to 4% of the peroxide catalyst, the time for other temperatures and other catalyst proportions being inversely proportional to the reflux temperature and the amount of catalyst present, the refluxing being carried out to a point short of producing an insoluble resin, the resin solution so derived being applied to the mica flakes, the solvent evaporated the mica flakes and applied resin heated above a temperature of 130° C. to produce the thermoset resin.

2. Insulation comprising mica flakes and a resinous binder applied to the mica flakes, the resinous binder comprising the thermoset reaction product derived by refluxing in an organic solvent having a boiling point of from 70° C. to 110° C. from 25 to 35 parts by weight of monostyrene, from 12 to 20 parts by weight of acrylonitrile, from 10 to 20 arts by weight of maleic anhydride, and from 45 to 35 parts by weight of diallyl phthalate, the total being 100 parts, and from 2 to 4 parts of a peroxide catalyst, the refluxing being so conducted for approximately 5 hours to a point short of producing a resin insoluble in the organic solvent, the resin solution so derived being applied to the mica flakes, the solvent being evaporated and then the mica flakes and applied resin being heated at a temperature of above 130° C. to thermoset the resin.

3. Insulation comprising mica flakes and a resinous binder applied to the mica flakes, the resinous binder comprising the thermoset resinous product derived by refluxing in an organic solvent having a boiling point of from 50° C. to 130° C. (*a*) from 1 to 4 moles of a nitrile having the formula

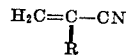

where R is a monovalent radical selected from the group consisting of hydrogen, methyl, ethyl, propyl and chlorine, (*b*) from 2 to 4 moles of at least one vinyl aryl compound having the formula

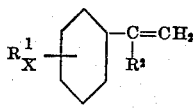

where $R^1$ is a monovalent radical selected from the group consisting of chlorine, fluorine and methyl, X is a number from 1 to 3, and $R_2$ represents a radical selected from the group consisting of hydrogen and methyl, (*c*) from ¾ to 2 moles of at least one acidic compound selected from the group consisting of ethylene alpha-beta dicarboxylic acids and their anhydrides, (*d*) from ½ to 3 moles of a diallyl ester of a dicarboxylic organic acid, and from ½% to 5%, based on the weight of the reactants, of a peroxide catalyst, the refluxing being conducted for a period of time, the time corresponding to 5 hours for a reflux temperature of from 70° C. to 110° C. and with 2 to 4% by weight of the catalyst, being present, the time being inversely proportional to the reflux temperature and the amount of the catalyst for other reflux temperatures and different amounts of catalyst, the refluxing being carried out to a point short of producing an insoluble resin, the solution of resin so derived being applied to the mica flakes, the solvent evaporated and the mica flakes and applied resin being heated to a temperature of above 130° C.

4. A thermosettable resin derived by refluxing in an organic solvent having a boiling point of from 50° C. to 130° C. from 1 to 4 moles of acrylonitrile, from 2 to 4 moles of monostyrene, from ¾ to 2 moles of maleic anhydride, from ½ to 3 moles of diallyl phthalate, and from 0.5 to 5%, based on the weight of the reactants, of a peroxide catalyst, the refluxing being conducted at a temperature of between 50° C. and 130° C. for a period of time, the time being of the order of 5 hours for a reflux temperature of from 70° C. to 110° C. with from 1 to 4% of the peroxide catalyst, the time for other temperatures and other catalyst proportions being inversely proportional to the reflux temperature and the amount of catalyst present, the refluxing being carried out to a point short of producing an insoluble resin.

5. A thermosettable resin derived by refluxing in a ketone having a boiling point of between 70° C. to 110° C. from 25 to 35 parts by weight of monostyrene, from 12 to 20 parts by weight of acrylonitrile, from 10 to 20 parts by weight of maleic anhydride, and from 45 to 35 parts by weight of diallyl phthalate, the total being 100 parts, and from 2 to 4 parts of a peroxide catalyst, the refluxing being so conducted for approximately 5 hours to a point short of producing a resin insoluble in the organic solvent.

6. A thermosettable resin derived by refluxing in an organic solvent having a boiling point of from 60° C. to 130° C. (a) from 1 to 4 moles of a nitrile having the formula

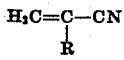

where R is a monovalent radical selected from the group consisting of hydrogen, methyl, ethyl, propyl and chlorine, (b) from 2 to 4 moles of at least one vinyl aryl compound having the formula

where $R^1$ is a monovalent radical selected from the group consisting of a chlorine, fluorine and methyl, X is a number from 1 to 3, and $R_2$ represents a radical selected from the group consisting of hydrogen and methyl, (c) from ¾ to 2 moles of at least one acidic compound selected from the group consisting of ethylene alpha-beta dicarboxylic acids and their anhydrides, (d) from ½ to 3 moles of a diallyl ester of a dicarboxylic organic acid, and from ½% to 5%, based on the weight of the reactants of a peroxide catalyst, the refluxing being conducted for a period of time, the time corresponding to 5 hours for a reflux temperature of from 70° C. to 110° C. and with 2 to 4% by weight of the catalyst being present, the time being inversely proportional to the reflux temperature and the amount of the catalyst for other reflux temperatures and other amounts of catalyst, the refluxing being carried out to a point short of producing an insoluble resin.

HERBERT F. MINTER.

REFERENCES CITED

The following references are of record in the file of this patent:

UNITED STATES PATENTS

| Number | Name | Date |
|---|---|---|
| 2,479,522 | Strain | Aug. 16, 1949 |